F. CORSA.
Tires for Vehicle-Wheels.
No. 157,796.  Patented Dec. 15, 1874.
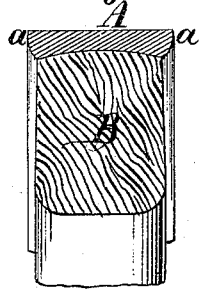
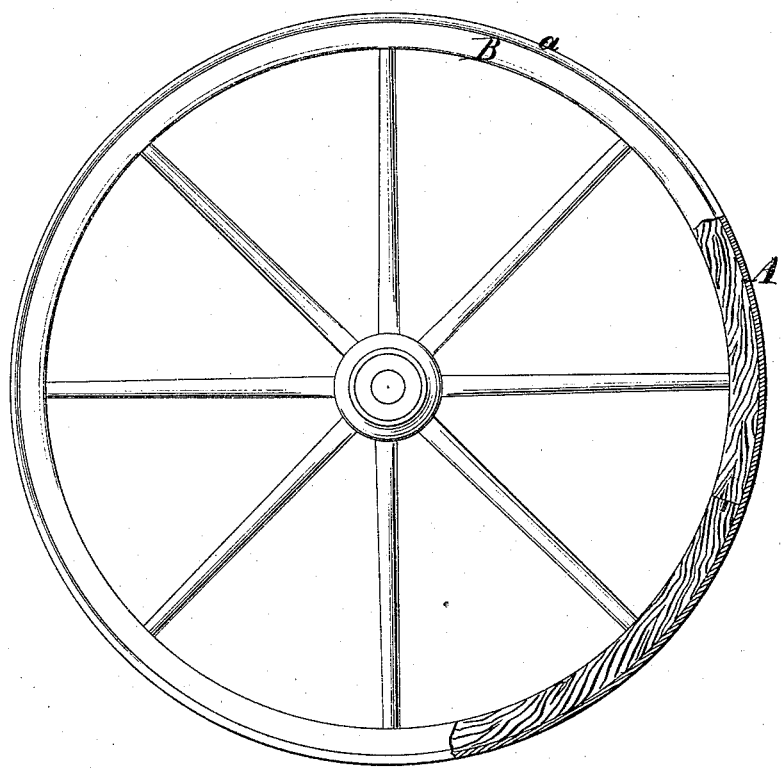
Witnesses:
Ernst Bilhuber.
Henry Gentner
Inventor:
Frank Corsa
Van Santvoord & Hauff
Att'ys

UNITED STATES PATENT OFFICE.

FRANK CORSA, OF BROOKLYN, NEW YORK.

IMPROVEMENT IN TIRES FOR VEHICLE-WHEELS.

Specification forming part of Letters Patent No. 157,796, dated December 15, 1874; application filed November 19, 1874.

*To all whom it may concern:*

Be it known that I, FRANK CORSA, of Brooklyn, in the county of Kings and State of New York, have invented a certain new and useful Improvement in Wheel-Tire, of which the following is a specification:

This invention is illustrated in the accompanying drawing, in which Figure 1 represents a transverse section. Fig. 2 is a sectional elevation in a smaller scale than the previous figure.

Similar letters indicate corresponding parts.

This invention relates to a wheel-tire, the inner surface of which is made concave to correspond to the convex face of the felly, said tire being provided with rounded edges, which project beyond the sides of the felly in such a manner that the tire can be applied to the felly by the ordinary process of shrinking, and when it is applied, its projecting edges fully protect the sides of the felly.

In the drawing, the letter A designates my tire, the inner surface of which is concave, and B is the felly, the face of which is convex, to correspond to the inner concave surface of the tire. In preparing the tire and the felly, however, great care must be taken to keep the concavity of the tire and the convexity of the felly within certain limits, for it is evident that if the concavity of the tire and the convexity of the felly are too great, the operation of shrinking on the tire cannot be performed successfully. If the tire, in being cooled, shrinks or contracts one inch, it is evident that the circumference of the central part of the felly must exceed the circumference of the outside edges thereof by less than one inch, or else if the tire is heated and placed round the felly, and then cooled, it will not contract sufficiently to take a firm hold of the felly. But if the concavity of the tire and the corresponding convexity of the felly are properly gaged, my tire can be applied to the felly by the ordinary process of shrinking, and when applied it retains its position on the felly without any screws or other fastening devices, and at the same time the felly is firmly compressed and prevented from releasing the spokes.

My tire is provided with rounded edges $a$ $a$, which project over the sides of the felly and protect the same against injury if the wheel runs against a curbstone or any other obstruction.

By these means a tire is obtained which can be applied to the felly by the ordinary process of shrinking, which requires no screws or other fastenings for retaining it in position on the felly, and which, on account of its projecting edges, protects the sides of the felly.

By my invention it will be seen that the width of the tire on its interior surface is just equal to the width of the face of the felly, while both sides of said tire radiate or flare outwardly from such edges, so that the tread surface of the tire is much greater than the inner surface, which comes in contact with the face of the felly, and both sides of the felly are protected from abrasion by contact with the rails of street-railways.

I am aware that wheel-tire have been made with concave inner surfaces, but such proved to be a failure, chiefly because no care was taken to keep the concavity within the proper limits, and, furthermore, they lacked the projecting edges for protecting the sides of the fellies. I am also aware that a wheel-tire was patented by H. Silvester, April 2, 1872, which shows the projecting flanges for protecting the sides of the tire, but his tire is so formed that it cannot possibly be applied to the felly by shrinking, and thereby the principal object of the tire is lost.

What I claim as new, and desire to secure by Letters Patent, is—

The tire A, for carriage-wheels, formed with its inner concave surface equal to the face of the fellies, and with projecting upwardly-flaring side edges $a$ $a$, and a flat tread surface broader than the interior surface of the tire, substantially as set forth.

In testimony that I claim the foregoing I have hereunto set my hand and seal.

FRANK CORSA. [L. S.]

Witnesses:
    J. VAN SANTVOORD,
    E. F. KASTENBHUER.